US006373723B1

(12) United States Patent
Wallgren et al.

(10) Patent No.: US 6,373,723 B1
(45) Date of Patent: Apr. 16, 2002

(54) METHOD AND DEVICE FOR GENERATING VOLTAGE PEAKS IN AN ELECTROSTATIC PRECIPITATOR

(75) Inventors: Bernt Wallgren, Nol; Andreas Wramdemark, Mölndal, both of (SE)

(73) Assignee: Kraftelektronik AB, Surte (SE)

( * ) Notice: Subject to any disclaimer, the term of this patent is extended or adjusted under 35 U.S.C. 154(b) by 0 days.

(21) Appl. No.: 09/719,232

(22) PCT Filed: Jun. 18, 1999

(86) PCT No.: PCT/SE99/01104

§ 371 Date: Dec. 11, 2000

§ 102(e) Date: Dec. 11, 2000

(87) PCT Pub. No.: WO99/65608

PCT Pub. Date: Dec. 23, 1999

(30) Foreign Application Priority Data

Jun. 18, 1998 (SE) .............................................. 9802177

(51) Int. Cl.[7] ........................ H02M 3/335; H02M 7/537

(52) U.S. Cl. .......................... 363/16; 363/131; 323/903

(58) Field of Search .................... 363/16, 131; 323/903

(56) References Cited

U.S. PATENT DOCUMENTS

| | | | | |
|---|---|---|---|---|
| 4,600,411 A | * | 7/1986 | Santamaria | 96/82 |
| 4,648,887 A | | 3/1987 | Noda et al. | 55/2 |
| 5,217,504 A | * | 6/1993 | Johansson | 95/7 |
| 5,477,464 A | * | 12/1995 | Jacobsson | 702/65 |
| 5,707,422 A | * | 1/1998 | Jacobsson et al. | 95/6 |

FOREIGN PATENT DOCUMENTS

| | | | |
|---|---|---|---|
| EP | 0055525 | 7/1982 | B03C/3/68 |
| EP | 0209714 | 1/1987 | H02M/3/335 |

* cited by examiner

*Primary Examiner*—Bao Q. Vu

(57) ABSTRACT

The method of invention relates to a method and device for generating voltage peaks in an electrostatic precipitator via generation of current pulse, where each voltage peak is generated by a group of current pulses. A device according to the invention comprises a first and a second means for converting alternating current to direct current, and also so first means for converting direct current to alternating current, and the first means for converting direct current to alternating current comprises a resonance converter.

33 Claims, 4 Drawing Sheets

METHOD AND DEVICE FOR GENERATING VOLTAGE PEAKS IN AN ELECTROSTATIC PRECIPITATOR

This application is the national phase under 35 U.S.C. §371 of PCT International Application No. PCT/SE99/01104 which has an International filing date of Jun. 18, 1999, which designated the United States of America.

BACKGROUND OF THE INVENTION

1. Field of the Invention

The present invention relates to a method and a device for generating voltage peaks in electrostatic precipitators, in particular those electrostatic precipitators which are used for purification in power stations and similar installations, the gas discharges of which contain dust particles.

2. Description of Related Art

One way of separating dust particles from a gas is to use an electrostatic dust precipitator, sometimes also referred to as an ESP or an electrostatic precipitator. Examples of common areas of application of electrostatic precipitators are coal-fired power stations, cement factories and refuse incineration.

As is clear from the name, an electrostatic precipitator makes use of electrostatic forces to separate dust particles from a gas. Broadly speaking, this is effected in the following manner: the gas is led into a chamber which contains vertical metal curtains which divide the chamber into a number of parallel gas passages. Arranged centrally in each passage is a frame with electrodes arranged in it, which can often consist of wires. All the frames are interconnected, and form a continuous framework. The entire framework is suspended in supporting insulators, which results in the framework being electrically insulated from the other parts of the precipitator.

A high-voltage rectifier which generates rectified voltage, for example in the form of pulses, is connected between the framework and earth, as a result of which an electric field is obtained between the wires in the framework and the metal curtains. This electric field causes the dust particles in the gas to move towards the plate curtains, and to adhere to these. By shaking or knocking the plate curtains, an accumulated mass of dust is freed and falls down, under its own weight, into a dust container intended for it. It can be shown that the quantity of dust removed from the gas depends on the growth derivative of the voltage pulses; the higher the growth derivative, the more dust can be separated from the gas. This is especially noticeable in the case of dust with high resistivity.

In connection with electrostatic precipitators, it is of course desirable to achieve as high a degree of separation as possible, at the same time as the price of the separation arrangement is to be kept as low as possible.

Previously known arrangements for generating rectified voltage pulses in electrostatic precipitators can, broadly speaking, be divided into two categories. The first category generates rectified voltage pulses of which the growth derivative is in step with that of the mains voltage, which results in a relatively inexpensive arrangement which, however, on account of a low growth derivative, has a relatively low degree of cleaning, particularly for dust with high resistivity.

The second category of previously known arrangements for generating rectified voltage pulses in electrostatic precipitators generates rectified voltage pulses with a high growth derivative by means of oscillating circuits. The energy in the pulses is, in other words, fed back to the arrangement. These arrangements achieve a high degree of dust separation for dust with high resistivity as well, but are relatively expensive.

In other words, two main categories of arrangements for generating rectified voltage pulses in electrostatic precipitators have existed previously, one type achieving low cost, and the other type achieving a high degree of separation.

U.S. Pat. No. 4,648,887 shows a method for controlling electrostatic precipitators. The method shown in this document comprises generating voltage pulse-trains to an electrostatic precipitator by means of current pulses, with the pulses of each voltage pulse-train comprising a number of sub-pulses. A drawback of this method is that each voltage sub-pulse corresponds on a one-to-one basis to a current pulse. The current pulses come from rectified AC from an ordinary AC-source. The time between the current pulses and thus between the voltage sub-pulses is thus determined by the frequency of the AC-source used, and cannot be varied.

SUMMARY OF THE INVENTION

The problem solved by the present invention is that of providing an electrostatic precipitator which allows a high degree of cleaning, or dust separation, at a lower cost than has previously been possible, especially for dust with high resistivity.

This problem is solved by means of a method for generating individual voltage peaks in an electrostatic precipitator via generation of current pulses, comprising rectifying AC from a power supply into DC, with monitoring and controlling of said rectification so that each individual voltage peak in the precipitator is built up by a group of pulses of DC current, which pulses are supplied to the precipitator. The build-up of the voltage peaks in the precipitator is monitored and controlled, and each current pulse group is discontinued when their corresponding voltage peak in the precipitator has reached a desired value.

Preferably, the method according to the invention further comprises rectifying and smoothing the AC from the power supply into DC in a first step, and converting and transforming the DC from said first step into high-frequency AC, and also rectifying said high-frequency AC into corresponding DC-pulses.

In a preferred embodiment of the method according to the invention, the current pulses in each group are generated with such an amplitude and frequency that the voltage peaks increase with a derivative which exceeds 30 kV/ms.

The problem is also solved by means of a device for generating individual voltage peaks in an electrostatic precipitator via generation of current pulses, said device comprising first rectifying means for rectifying AC from a power supply into DC, means for monitoring and controlling said first rectifying means so that each voltage peak in the precipitator is built up by a group of pulses of DC-current, which pulses are supplied to the precipitator, and means for monitoring and controlling the build-up of the voltage peaks in the precipitator. The device also comprises means for discontinuing each current pulse group when their corresponding voltage peak in the precipitator has reached a desired value.

Preferably, the first rectifying means in the device according to the invention additionally comprises means for rectifying and smoothing the AC from the power supply into DC in a first step, means for converting and transforming the DC from said first step into high-frequency AC, and means for rectifying said high-frequency AC into corresponding DC-pulses.

In addition, the device according to the invention may additionally comprise means for varying the number of DC-pulses in each DC-pulse group to the precipitator, to reach the desired value of each voltage peak.

In a preferred embodiment, the device according to the invention is provided with means for generating voltage peaks which increase with a derivative which exceeds 30 kV/ms.

BRIEF DESCRIPTION OF THE DRAWINGS

The invention will be described in greater detail below with the aid of an example of an embodiment, and with the aid of the appended drawings, in which.

PREFERRED EMBODIMENT

Figure 1:
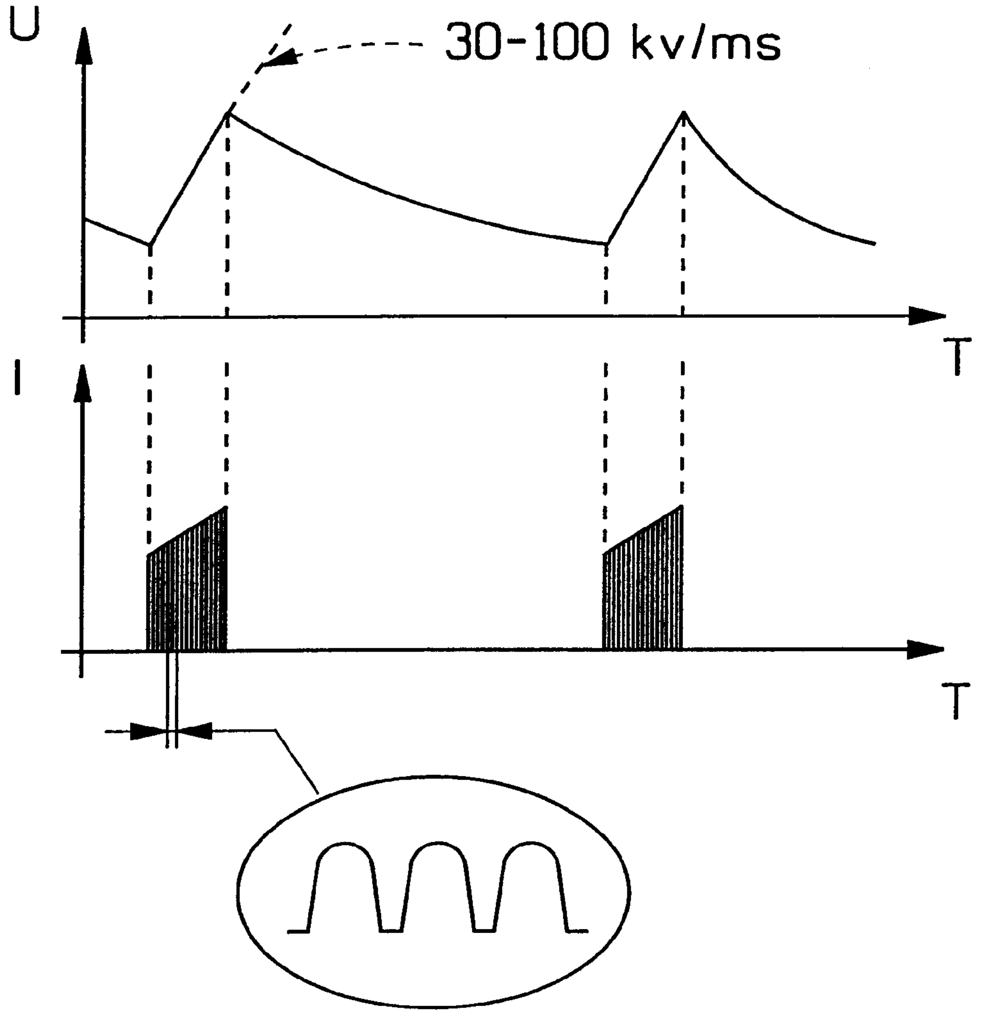
FIG. 1 shows a current-voltage diagram which is obtained by virtue of the invention.

FIG. 1 shows a current-voltage diagram which is obtained in an electrostatic precipitator by virtue of the present invention. As can be seen from the drawing, voltage peaks (U) are obtained with a steep positive growth derivative and a less steep negative derivative. According to the invention, as can also be seen from FIG. 1, each voltage peak is built up by a group of current pulses. The time between each group of current pulses is referred to below as the OFF time, and the time the group of current pulses lasts is referred to below as the ON time.

It is desirable that the voltage peaks generated have as high a growth derivative as possible. The growth derivative is preferably to exceed 30 kV/ms, and so the current pulses in the groups corresponding to each voltage peak must be given such an amplitude and frequency that this derivative is achieved.

Figure 2:
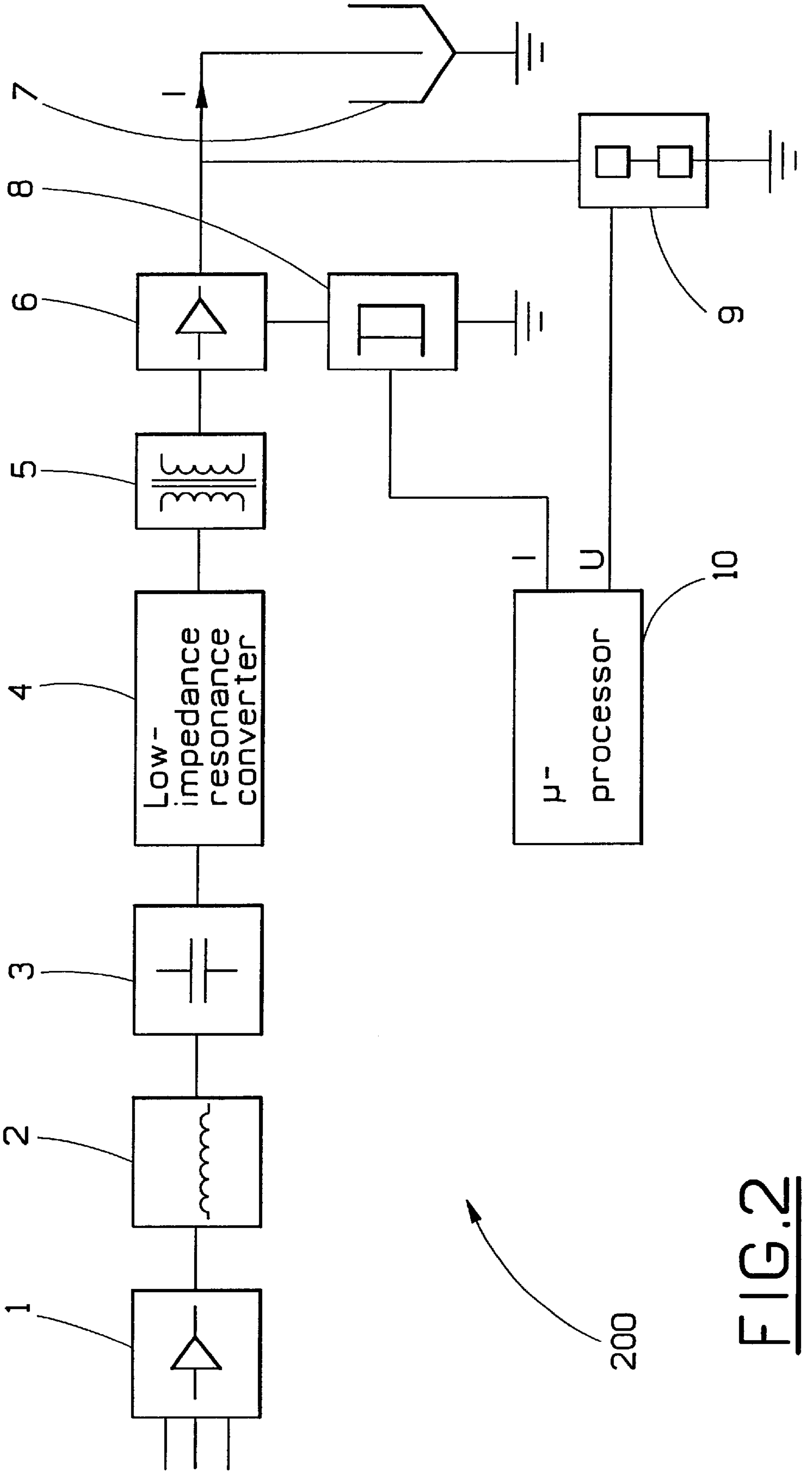
FIG. 2 shows a block diagram of a device used according to the invention.

FIG. 2 shows a device 200 according to the invention, for generating groups of current pulses which in turn build up the desired individual voltage peaks. The device 200 comprises first rectifying means 1–6 for rectifying AC from a power supply into DC, means for monitoring 8,9 and controlling 10 said rectification, means for monitoring 8,9 and controlling 10 the build-up of voltage peaks to the precipitator 7, and means 4,10 for discontinuing each current pulse when the corresponding voltage peak in the precipitator has reached a desired value.

In a preferred embodiment of the invention, as shown in FIG. 2, the first rectifying means comprise a rectifier bridge 1, an impedance coil 2 and a storage capacitor 3. This first part of the device 200 forms a means for rectifying and smoothing alternating current to direct current in a first step, and can therefore be connected to an AC voltage, for example normal mains voltage.

The first rectifying means preferably also comprises means for converting and transforming the direct current from the first step into high-frequency alternating current, which conversion and transforming means in a preferred embodiment comprise a low-impedance resonance converter 4 and a transformer 5.

In addition, the first rectifying means preferably also comprise second rectifying means, for converting the high-frequency alternating current from the conversion 4 and transforming means 5 into corresponding direct current pulses, which second rectifying means preferably comprise a rectifier bridge 6. Connected to the rectifier bridge 6 is the electrostatic precipitator 7, across which the device is to generate voltage peaks.

The device 200 also comprises controlling means 10. The controlling means 10 is used primarily for controlling the build-up of the voltage peaks in the precipitator, for discontinuing each current pulse group when their corresponding voltage peak in the precipitator has reached a desired value, for controlling the above mentioned ON and OFF times as well as the time between the current pulses which form a group of current pulses during the time that a voltage peak is generated, and also the amplitude and frequency of the current pulses. In a preferred embodiment, a microprocessor 10 is used as controlling means.

As can be seen from FIG. 2, the values of the voltage over as well as the current to the precipitator 7 are fed back in the device 200 to the microprocessor 10 by two connections. The voltage over the precipitator is fed back to the microprocessor 10 by means of a voltage divider 9, and the value of current to the precipitator is obtained by means of what is known as a current shunt 8. The current shunt 8, the voltage divider 9 and the microprocessor 10 thus constitute means for monitoring the build-up of the voltage peaks in the precipitator The means 4 for converting the direct current from the first step into high-frequency alternating current is controlled by the controlling means 10, i.e. the microprocessor. Thus, the number of pulses, and their duration can be controlled by the microprocessor by switching the conversion means on or off, depending on the voltage and current value fed back to the controlling means via the shunt 8 and the voltage divider 9.

The conversion means, the low impedance resonance converter 4, comprises semiconductors which are controlled by the controlling means 10, preferably arranged in a so called H-bridge comprising IGBT-transistors (Insulated Gated Bipolar Transistors). A capacitance and an inductance in the bridge form an oscillating circuit, with the transformer 5, the rectifier 6 and the precipitator 7 as its load. In order to obtain a low impedance in the circuit, the capacitance in the resonance converter is considerably much larger and the inductance considerably smaller than for a normally dimensioned resonance converter.

According to the invention, the transformer 5 is preferably a transformer which has a leakage inductance $L_S$ which is very low. A suitable upper limit for the leakage inductance of the transformer 5 is 3 μH. Preferably, use is made of a transformer of which the leakage inductance is defined by the expression $L_S \leqq U_{3-4}/(C_F{}^*\pi^{2}{}^*N^*f_0{}^*dV/dt)$, where $C_F$ is the capacitance of the precipitator 7, N is the transformation ratio of the transformer 5, $f_0$ is the resonance frequency for the circuit formed by the transformer 5 and the resonance converter 4, $U_{3-4}$ is the voltage in the point between the storage capacitor 3 and the resonance converter 4, and dV/dt is the derivative with which the voltage peaks increase.

Figure 3:
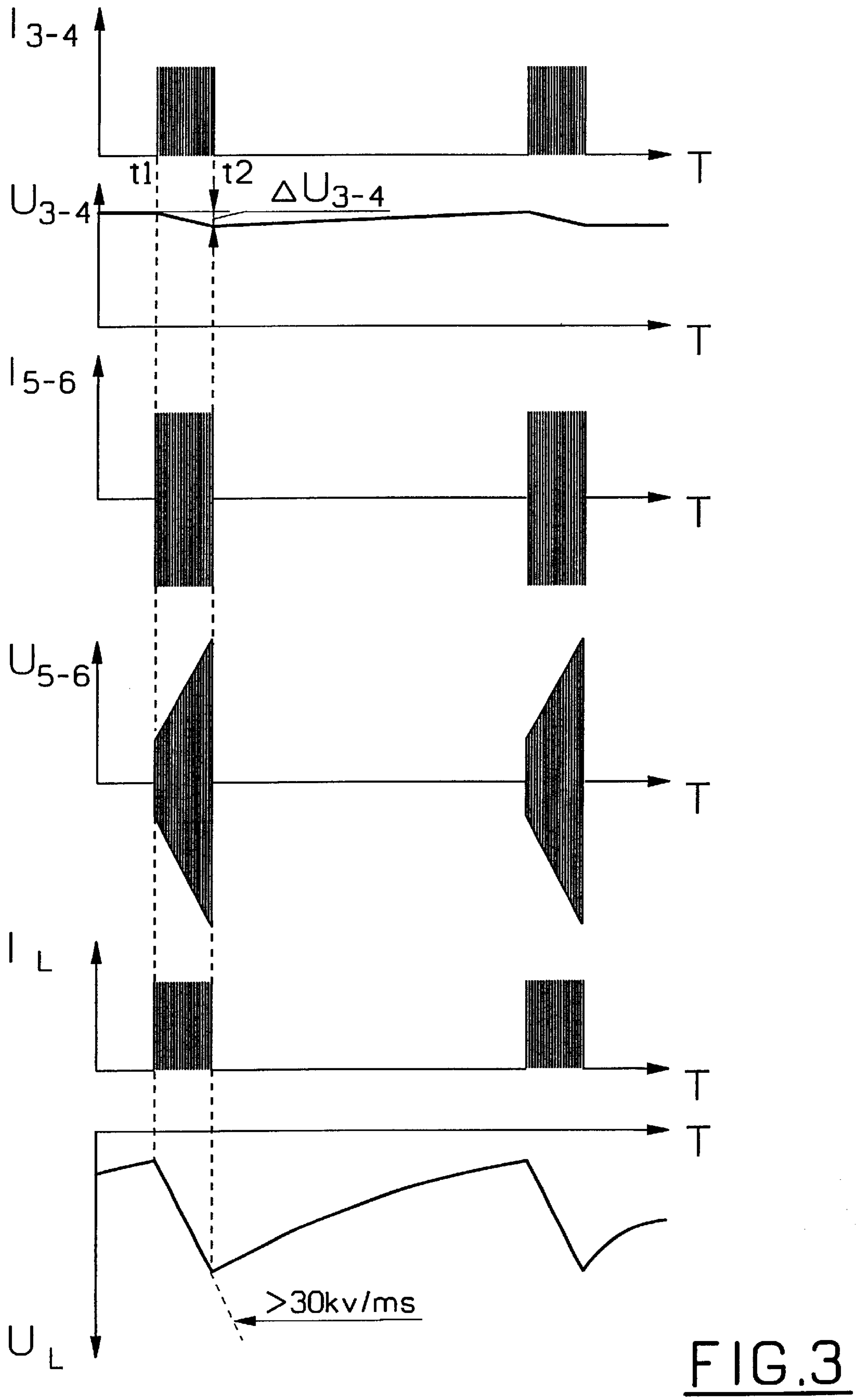
FIG. 3 shows the current-voltage diagram at various points in the block diagram in FIG. 2.

FIG. 3 diagrammatically shows current and voltage characteristics at a number of points in the block diagram in FIG. 2. The points shown are point 3–4, in other words the section between the storage capacitor 3 and the resonance converter 4, point 5–6, which is the section between the high-voltage transformer 5 and the rectifier bridge 6, and also the current $I_L$ and voltage $U_L$ which is output to the electrostatic precipitator 7.

As can be seen from the illustration of point 3–4 in FIG. 3, the microprocessor 10 controls the resonance converter 4 in such a manner that the current entering the resonance converter forms groups of pulses. The pulses in these pulse groups are generated with such an amplitude and frequency that the resulting voltage $U_{3-4}$ output from the capacitor 3 drops by at most a value $\Delta U_{3-4}$.

As also emerges from FIG. 3, the capacitor 3 is charged after each pulse group, which, however, takes place for a time which is longer than the time it took for the voltage to drop to the value $\Delta U_{3-4}$. How much the voltage drops, in other words the amplitude of the value $\Delta U_{3-4}$, depends on how much energy it has been possible to store in the capacitor 3. In a preferred embodiment of the invention, the capacitor is dimensioned so that $\Delta U_{3-4}$ corresponds to roughly 10% of the total amplitude $U_{3-4}$ of the voltage.

As can also be seen from FIG. 3, the amplitude of the voltage peaks has been transformed up in the section 5–6, in other words the point between the high-voltage transformer 5 and the rectifier bridge 6.

Finally, FIG. 3 also shows the resulting voltage $U_L$ and current $I_L$ output across the precipitator. As can be seen, by means of the transformer 5 and the rectifier bridge 6, voltage peaks $U_L$ are created out across the precipitator, which have a very steep growth derivative. In a preferred embodiment of the invention, the growth derivative is greater than 30 kV/ms. As can be seen, the pulses $U_L$ decay by self-discharge with a derivative which is smaller than the growth derivative. This is due to the fact that the invention, in contrast to previously known art for generating voltage peaks with such a derivative, does not comprise an oscillating circuit.

Figure 4:
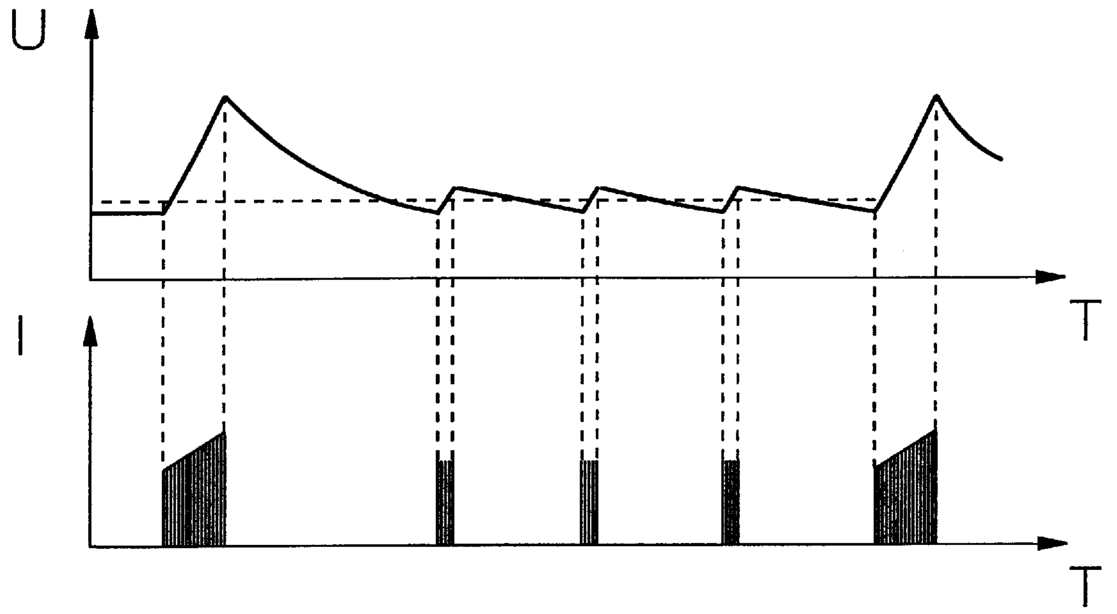
FIG. 4 shows the current-voltage diagram which is obtained in a variant of the invention.

FIG. 4 shows an example of another of the advantages of the present invention. During the OFF times, in other words during the discharge periods of the voltage peaks, the voltage across the precipitator may drop below a given desired level. In order to maintain the voltage, the microprocessor can then generate groups of current pulses which are smaller than the current pulse groups used for creating the "actual" voltage peaks, but which are of sufficient size to help maintain the voltage above the desired level.

The invention is primarily intended for application in devices where $f_0$ lies within the range 10–200 kHz, preferably within the range 10–100 kHz. In a preferred embodiment, the invention is implemented in a device where $f_0$ is 30 kHz.

The invention is not limited to the examples of embodiments described above, but may be varied freely within the scope of the patent claims below. For example, the voltage peaks described above and shown in the drawings can be given the opposite value while keeping the amplitude, in other words negative voltage peaks can, according to the invention, be generated while maintaining the function of the precipitator.

Moreover, the ON/OFF times according to the invention do not have to form a periodic pattern, but may be entirely different between/during the pulse groups, in other words the time that each group of current pulses lasts can be varied individually for different groups.

The invention may also be applied to any rectifying means controlled by a control means, for creating voltage peaks in an electrostatic precipitator.

What is claimed is:

1. Method for generating individual voltage peaks in an electrostatic precipitator via generation of current pulses, characterized in that it comprises rectifying AC from a power supply into DC, monitoring and controlling said rectification so that each individual voltage peak in the precipitator is built up by a group of pulses of DC current, which pulses are supplied to the precipitator, monitoring and controlling the build-up of the voltage peaks in the precipitator and discontinuing each current pulse group when their corresponding voltage peak in the precipitator has reached a desired value.

2. The method according to claim 1, wherein the conversion of AC from a power supply further comprises:

rectifying and smoothing the AC from the power supply into DC in a first step, converting and transforming the DC from said first step into high-frequency AC, and rectifying said high-frequency AC into corresponding DC-pulses.

3. The method according to claim 1 or 2, wherein the number of DC-pulses in each DC-pulse group to the precipitator is controlled to reach the desired value of each voltage peak.

4. The method according to claim 3, wherein the time between the DC-current pulse groups to the precipitator is controlled.

5. The method according to claim 1, wherein the time that each group of DC-current pulses to the precipitator lasts is varied individually for different groups.

6. The method according to claim 1, wherein the current pulses in each group are generated with such amplitude and frequency that the voltage peaks increase with a derivative which exceeds 30 kV/ms.

7. Device for generating individual voltage peaks in an electrostatic precipitator via generation of current pulses, comprising:

first rectifying means for rectifying AC from a power supply into DC, means for monitoring and controlling said first rectifying means so that each voltage peak in the precipitator is built up by a group of pulses of DC-current, which pulses are supplied to the precipitator, means for monitoring and controlling the build-up of the voltage peaks in the precipitator, and means for discontinuing each current pulse group when their corresponding voltage peak in the precipitator has reached a desired value.

8. The device according to claim 7, wherein the first rectifying means comprises:

means for rectifying and smoothing the AC from the power supply into DC in a first step, means for converting and transforming the DC from said first step into high-frequency AC, means for rectifying said high-frequency AC into corresponding DC-pulses.

9. The device according to claim 7 or 8, further comprising means for varying the number of DC-pulses in each DC-pulse group to the precipitator, to reach the desired value of each voltage peak.

10. The device according to claim 7, further comprising means for individually varying and controlling the time between the DC-current pulse groups to the precipitator.

11. The device according to claim 7, further comprising means for generating the DC-current pulses in each DC-current pulse group with such amplitude and frequency that the voltage peaks in the precipitator increase with a derivative which exceeds 30 kV/ms.

12. The device according to claim 7, wherein the means for rectifying said high-frequency AC into corresponding DC-pulses comprise a transformer of which the leakage inductance $L_S$ is defined by the expression $L_S \leqq U_{3-4}/(C_F*\pi^{2*}N*f_0*dV/dt)$, where $C_F$ is the capacitance of the precipitator, N is the transformation ratio of the transformer, $f_0$ is the resonance frequency for the circuit formed by the transformer and the resonance converter, $U_{3-4}$ is the voltage in the section between the storage capacitor and the resonance converter, and dV/dt is the derivative with which the voltage peaks increase.

13. The device according to claim 12, wherein the leakage inductance $L_S$ is below 3 $\mu$H, and $f_0$ lies within the range 10–200 kHz.

14. The device according to claim 7, wherein the means for converting and transforming the DC from said first step into high-frequency AC comprises a resonance converter.

15. The method according to claim 2, wherein the current pulses in each group are generated with such amplitude and frequency that the voltage peaks increase with a derivative which exceeds 30 kV/ms.

16. The method according to claim 3, wherein the current pulses in each group are generated with such amplitude and frequency that the voltage peaks increase with a derivative which exceeds 30 kV/ms.

17. The method according to claim 4, wherein the current pulses in each group are generated with such amplitude and frequency that the voltage peaks increase with a derivative which exceeds 30 kV/ms.

18. The method according to claim 5, wherein the current pulses in each group are generated with such amplitude and frequency that the voltage peaks increase with a derivative which exceeds 30 kV/ms.

19. The device according to claim 8, further comprising means for individually varying and controlling the time between the DC-current pulse groups to the precipitator.

20. The device according to claim 9, further comprising means for individually varying and controlling the time between the DC-current pulse groups to the precipitator.

21. The device according to claim 8, further comprising means for generating the DC-current pulses in each DC-current pulse group with such amplitude and frequency that the voltage peaks in the precipitator increase with a derivative which exceed 30 kV/ms.

22. The device according to claim 9, further comprising means for generating the DC-current pulses in each DC-current pulse group with such amplitude and frequency that the voltage peaks in the precipitator increase with a derivative which exceed 30 kV/ms.

23. The device according to claim 10, further comprising means for generating the DC-current pulses in each DC-current pulse group with such amplitude and frequency that the voltage peaks in the precipitator increase with a derivative which exceed 30 kV/ms.

24. The device according to claim 8, wherein the means for rectifying said high-frequency AC into corresponding DC-pulses comprise a transformer of which the leakage inductance Ls is defined by the expression $L_S \leqq U_{3-4}/(C_F*\pi"*N*\phi_0*dV/dt)$, where $C_F$ is the capacitance of the precipitator, N is the transformation ration of the transformer, $f_0$ is the resonance frequency for the circuit formed by the transformer and the resonance converter, $U_{3-4}$ is the voltage in the section between the storage capacitor 3 and the resonance converter, and dV/dt is the derivative with which the voltage peaks increase.

25. The device according to claim 9, in which the means for rectifying said high-frequency AC into corresponding DC-pulses comprise a transformer of which the leakage inductance $L_S$ is defined by the expression $L_S \leqq U_{3-4}/(C_F*\pi"*N*\phi_0*dV/dt)$, where $C_F$ is the capacitance of the precipitator, N is the transformation ration of the transformer, $f_0$ is the resonance frequency for the circuit formed by the transformer and the resonance converter, $U_{3-4}$ is the voltage in the section between the storage capacitor and the resonance converter, and dV/dt is the derivative with which the voltage peaks increase.

26. The device according to claim 10, wherein the means for rectifying said high-frequency AC into corresponding DC-pulses comprise a transformer of which the leakage inductance $L_S$ is defined by the expression $L_S \leqq U_{3-4}/(C_F*\pi"*N*\phi_0*dV/dt)$, where $C_F$ is the capacitance of the precipitator, N is the transformation ration of the transformer, $f_0$ is the resonance frequency for the circuit formed by the transformer and the resonance converter, $U_{3-4}$ is the voltage in the section between the storage capacitor and the resonance converter, and dV/dt is the derivative with which the voltage peaks increase.

27. The device according to claim 11, wherein the means for rectifying said high-frequency AC into corresponding DC-pulses comprise a transformer of which the leakage inductance $L_S$ is defined by the expression $L_S \leqq U_{3-4}/(C_F*\pi"*N*\phi_0*dV/dt)$, where $C_F$ is the capacitance of the precipitator, N is the transformation ration of the transformer, $f_0$ is the resonance frequency for the circuit formed by the transformer and the resonance converter, $U_{3-4}$ is the voltage in the section between the storage capacitor and the resonance converter, and dV/dt is the derivative with which the voltage peaks increase.

28. The device according to claim 8, wherein the means for converting and transforming the DC from said first step into high-frequency AC comprises a resonance converter.

29. The device according to claim 9, wherein the means for converting and transforming the DC from said first step into high-frequency AC comprises a resonance converter.

30. The device according to claim 10, wherein the means for converting and transforming the DC from said first step into high-frequency AC comprises a resonance converter.

31. The device according to claim 11, wherein the means for converting and transforming the DC from said first step into high-frequency AC comprises a resonance converter.

32. The device according to claim 12, wherein the means for converting and transforming the DC from said first step into high-frequency AC comprises a resonance converter.

33. The device according to claim 13, wherein the means for converting and transforming the DC from said first step into high-frequency AC comprises a resonance converter.

* * * * *